J. D. WEBBER.
AUTOMATIC WEIGHING APPARATUS.
APPLICATION FILED JAN. 10, 1914.
1,203,286.
Patented Oct. 31, 1916.
3 SHEETS—SHEET 1.
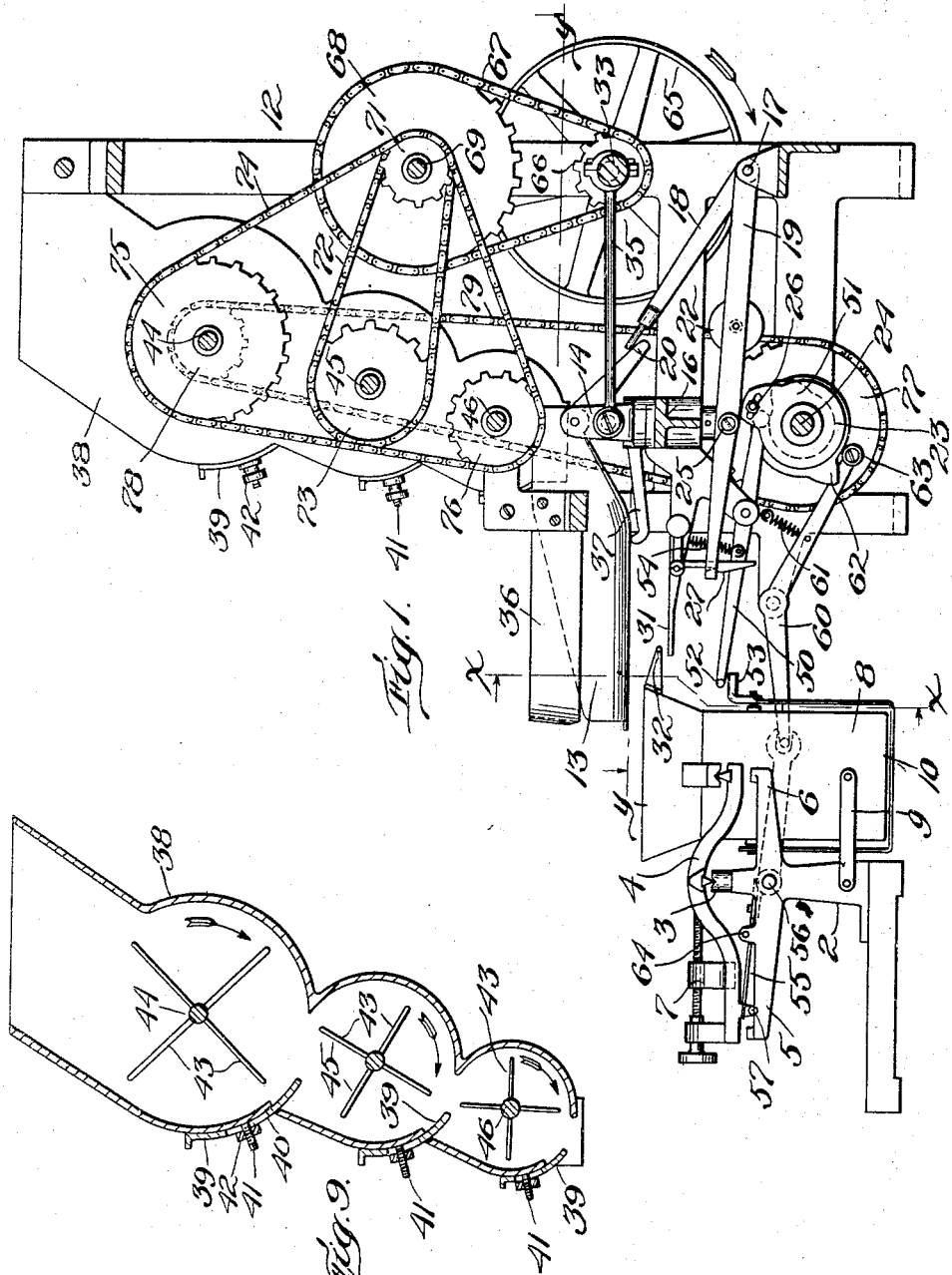
WITNESSES:
INVENTOR
John D. Webber J. D. WEBBER.
AUTOMATIC WEIGHING APPARATUS.
APPLICATION FILED JAN. 10, 1914.
1,203,286.
Patented Oct. 31, 1916.
3 SHEETS—SHEET 2.
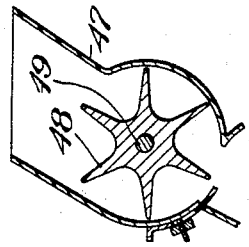
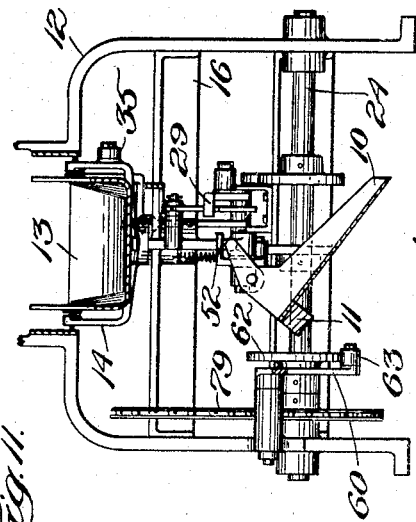
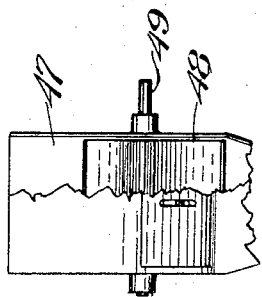
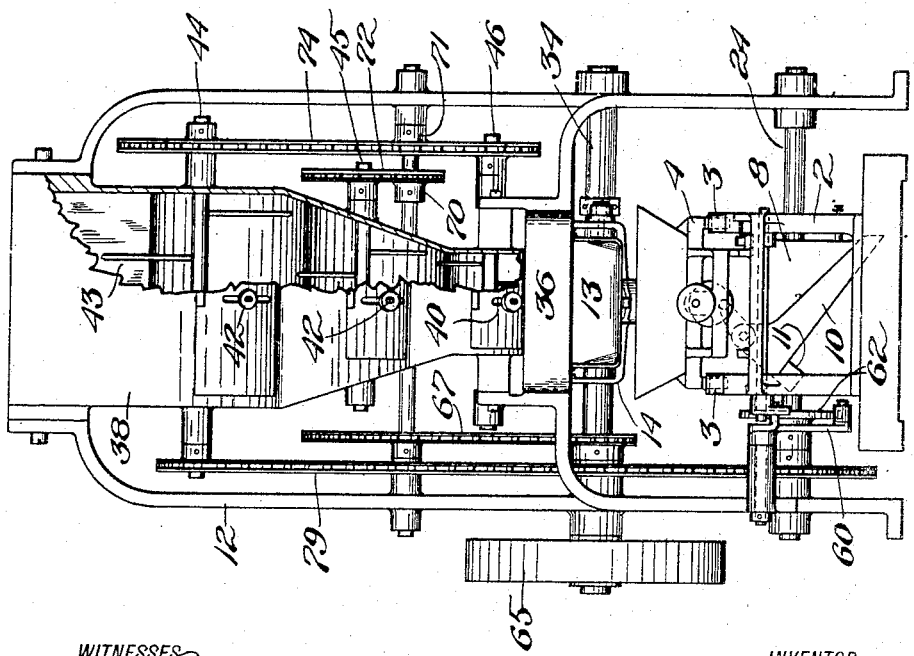
WITNESSES
INVENTOR
John D. Webber

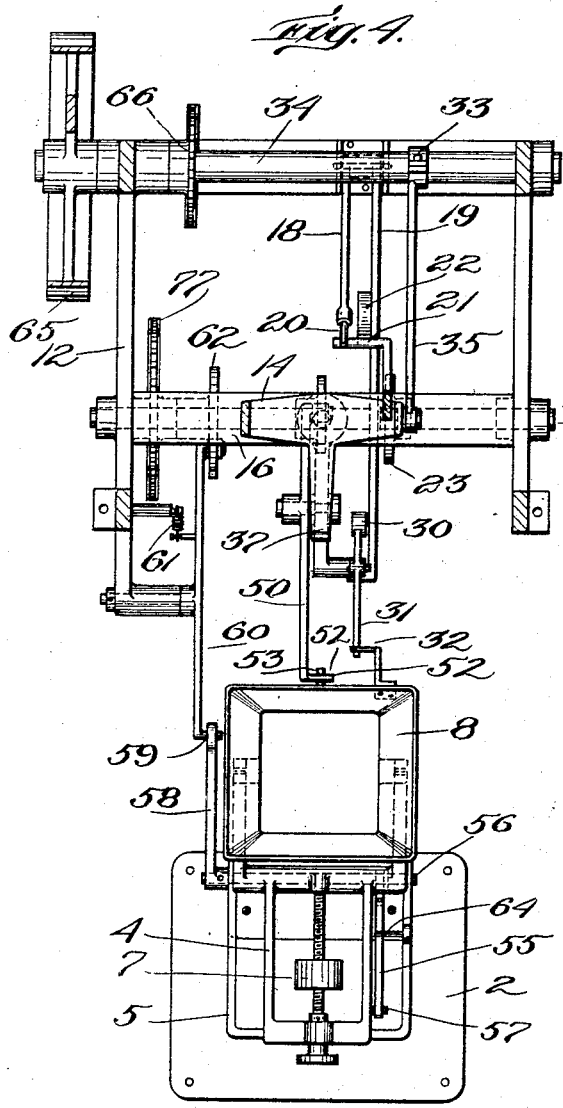
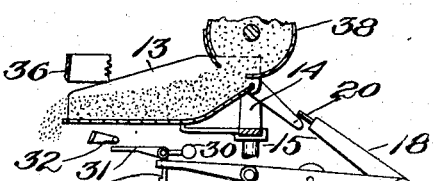
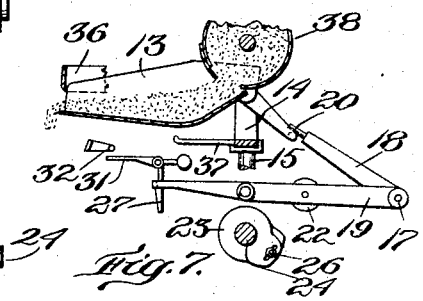
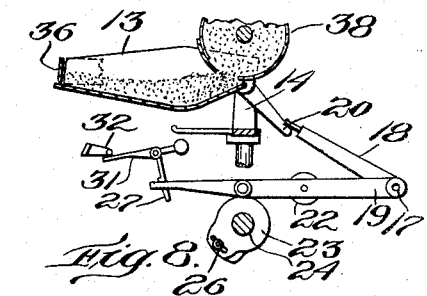
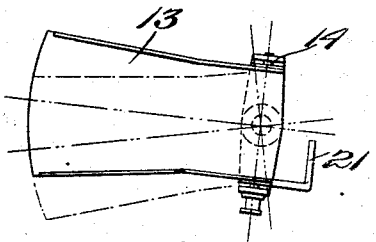

UNITED STATES PATENT OFFICE.

JOHN D. WEBBER, OF BAYONNE, NEW JERSEY, ASSIGNOR, BY MESNE ASSIGNMENTS, TO RICHARD H. WRIGHT, OF DURHAM, NORTH CAROLINA.

AUTOMATIC WEIGHING APPARATUS.

1,203,286.      Specification of Letters Patent.      Patented Oct. 31, 1916.

Application filed January 10, 1914. Serial No. 811,365.

*To all whom it may concern:*

Be it known that I, JOHN D. WEBBER, a citizen of the United States, residing at Bayonne, in the county of Hudson and State of New Jersey, have invented new and useful Improvements in Automatic Weighing Apparatus, of which the following is a specification.

This invention is intended to provide an automatic weighing apparatus which will successfully handle various materials having such physical characteristics that it is difficult to feed them to a scale with sufficient regularity and uniformity to insure the desired accuracy of the loads weighed thereby. Finely divided smoking tobacco is a good example of a material of the character above referred to, and the embodiment of my invention which is illustrated in the drawings is particularly adapted and intended for weighing this material. The same apparatus, however, is well adapted for weighing a variety of other materials, and certain features of the invention can be employed to advantage in many different types of automatic weighing machines.

Of those features of my invention which have a special utility in the weighing of finely divided smoking tobacco, one resides in a stream controller which is vibrated laterally to facilitate the flow of material and is also tilted on a horizontal axis to permit or stop the flow, while another feature relates to a feeder for the material, whereby the latter is supplied at a uniform rate and without clogging or becoming compacted. These and other features of my invention are hereinafter explained at length in connection with the accompanying drawings, in which:

Figure 1 is a side elevation, with certain parts shown in section, of the complete apparatus as preferably constructed; Fig. 2 is a front elevation of the same, partly broken away at its upper portion; Fig. 3 is a vertical section on the plane indicated by the line $x$—$x$ in Fig. 1, looking toward the rear of the machine; Fig. 4 is a sectional plan view, the plane of section being indicated by the line $y$—$y$ in Fig. 1; Fig. 5 is a detail view, in plan, of the stream controller hereinafter described; Figs. 6, 7 and 8 are sectional elevations of the stream controller and immediately associated parts, showing the controller in full stream, drip stream and cut-off positions respectively; Fig. 9 is a vertical section through the feeder shown in Figs. 1 and 2; Fig. 10 is a similar view showing a slightly modified feeder; and Fig. 11 is a front elevation, partly broken away, of the feeder shown in Fig. 10.

For reasons hereinafter explained it is desirable to employ two separate and distinct frameworks for supporting the moving parts of my apparatus, the scale beam, weighing bucket and weighing weight being carried by one framework and the feeding and flow-controlling mechanisms being carried by the other. The first-mentioned framework, shown at 2, is provided with fulcrum blocks 3 on which rest the usual knife-edge fulcrums of the scale beam 4, and with laterally-extending portions 5 and 6 which serve as stops to limit the tilting movements of the scale beam and to support the corresponding ends of the latter when in the bucket-filling and bucket-discharging positions respectively. The scale beam 4 is provided with the adjustable weighing weight 7 and carries a weighing bucket 8 which is kept upright by the parallel motion link 9, all of which parts may be of any usual or suitable construction. The bucket closer, shown at 10, is pivotally supported on the sides of the bucket 8, and preferably the construction is such that when the closer 10 is shut its bottom slants downwardly toward the free end of the closer at a substantial angle, so as to facilitate the quick discharge of the weighed loads. I also prefer to provide the closer 10 with a counterweight 11 so located and of such mass that it will hold the closer shut against the weight of a full load of material in the bucket 8 unless the closer is forcibly opened, as hereinafter explained.

The other framework above referred to is shown at 12, and of the parts carried thereby I will first describe the stream controller 13, which also serves to transfer the material to be weighed from the feeder hereinafter described to the weighing bucket 8. It has substantially the form of a scoop or spout, with upright sides, an open top and a bottom which is substantially flat at the discharging end of the controller but curves upwardly toward its rear end, where it receives the material from the feeder. At or adjacent to its rear end the stream controller 13 is mounted on horizontal pivots carried by the arms of a yoke 14 which is centrally supported on a vertical axis 15 journaled in a cross bar 16 of the framework 12, so that the controller is adapted to be tilted on a horizontal axis and independently oscillated on a vertical axis.

When the controller is in its lowermost position its bottom is substantially horizontal and the controller delivers a full stream of material to the weighing bucket 8, over which its discharging end is located. From its lowermost position the discharging end of the controller may be lifted until it delivers merely a small or drip stream of the material, as shown in Fig. 7, or until the delivery of material is entirely cut off, as shown in Fig. 8, and for tilting the controller to cause it to assume one or another of these different positions I employ a power-operated mechanism comprising a rock-shaft 17 mounted on the framework 12 and carrying two arms 18 and 19, of which the arm 18 is provided at its free end with a pin 20 which overlies a finger 21 secured to the stream controller 13 and located in the rear of its horizontal axis, so that a downward movement of said arm and finger results in elevating the discharging end of the controller. Such movement is effected by means of a counterweight 22 secured to the arm 19 and for elevating said arms in opposition to the counterweight I employ a cam 23 secured to a countinuously-rotating counter-shaft 24 and coöperating with a roller 25 mounted on the arm 19. This cam 23 is preferably composed of two parts having overlapping cam surfaces and secured together by a screw and slot connection shown at 26, whereby the cam may be adjusted to vary as desired the period of elevation of the arms 18 and 19, which period determines the interval during which a full stream of material is supplied to the bucket 8.

For maintaining the controller 13 in discharging position until a load is completed in the weighing bucket 8 I employ a latch 27, which is pivotally supported on the framework 12 and has a shoulder 28 adapted to engage and support a lateral projection 29 (Fig. 3) on the free end of the arm 19 after said arm has been elevated by the cam 23. A weighted arm 30 secured to the latch holds it in contact with the projection 29, and another arm 31 which is also connected to the latch and extends therefrom in the opposite direction from the arm 30 has its free end located beneath a finger 32 secured to the weighing bucket 8 in such position that as soon as the bucket moves downward upon the completion of a load therein said finger engages the arm 31 and trips the latch. This releases the arm 19, and thereupon the counterweight 22 causes the arm 18 to elevate the controller 13 into the position shown in Fig. 8, thereby stopping the delivery of material to the weighing bucket. In the construction illustrated the latch 27 is arranged to engage and support the projection 29 after the arm 19 has moved downward somewhat from the position shown in Fig. 6, in which the controller 13 is discharging a full stream of material, so that the completion of the loads in the bucket 8 by means of a reduced or drip stream is provided for. It will be evident, however, that the latch 27 may be caused to support the arm 19 in any position of the latter, prior to the complete stopping of the stream, by suitably locating the shoulder 28 on said latch, so that the arrangement is readily adapted for use in cases where the employment of a drip stream for completing the loads is not required.

In addition to being tilted on its horizontal axis as above described, the stream controller 13 is oscillated horizontally on its vertical axis. This is for the purpose of facilitating the flow of material along the bottom of the controller and its regular discharge therefrom, and is important when a material like finely-divided smoking tobacco is being handled. Preferably the controller is caused to oscillate continuously, whether in one or another of its stream-controlling positions, since the employment of means for clutching it to and unclutching it from the oscillating mechanism is thereby avoided, and in the construction illustrated continuous oscillation of the controller 13 is effected by means of an eccentric 33 secured to a continuously rotating shaft 34 and carrying one end of a connecting rod 35 the other end of which is pivoted to one side of the yoke 14, as shown in Fig. 4. In order to prevent the material in the controller 13 from being shaken out of the same by its oscillation when in the cut-off position, I employ a band or strip 36 which is fixed at its ends to the framework 12 and extends transversely in front of the discharging end of the controller at such an elevation that when said controller is tilted into the position shown in Fig. 8 said band closes its front end, thus serving in effect as a fixed valve member. It also prevents excessive discharge from the controller when in drip-stream position. The length of this band 36 is enough greater than the width of the controller to permit the lateral oscillations of the latter, and to the same end the finger 21 is given such length that it will always remain beneath the pin 20 while the controller is oscillating. These parts 20 and 21, however, are preferably relieved from engagement with each other when the controller is in the full-stream position by providing the yoke 14 with a forwarding extending arm 37 which supports the bottom of the controller during its oscillations when in the position last referred to.

The stream controller 13 receives the material from a feeder which, as preferably constructed, is shown in Figs. 2 and 9. This feeder comprises a hopper-like casing 38 supported on the framework 12 and having its walls so shaped as to provide therein a series of compartments (in the present instance, three in number) which progressively diminish in size from the top to the bottom of the feeder. The front and back walls of each compartment are formed on substantially circular curves, with each back wall extending forward at its lower end sufficiently to carry the greater part of the weight of the material in the corresponding compartment, and at the bottom of each compartment is a discharge opening the width of which from front to back may be varied by a suitable means such as a sliding plate 39, one edge of which extends through an opening in the front wall of the casing at a point a little above the lower end of the corresponding back wall. Each of the plates 39 is slotted as at 40 to receive a threaded pin 41 carried by the casing and provided with a nut 42, whereby the plate may be secured in adjusted position. Within each of the compartments of the casing 38 is located an agitating device consisting of a transversely-extending horizontal shaft provided with a number of fingers 43 radiating in various directions, each shaft being located substantially at the center of curvature of the front and back walls of its compartment directly over or a little in the rear of the front end of the back wall, and having its fingers 43 of such length as to extend nearly to said walls, so that all of the material in each compartment is subjected to the action of the agitator therein. The three feeder shafts 44, 45 and 46, are rotated simultaneously in the same direction, which is such that the fingers 43 move downwardly along the back walls of the respective compartments, but the speeds of rotation of said shafts are different, that of the upper shaft 44 being the slowest and that of the lower shaft 46 being the fastest, while the intermediate shaft 45 is rotated at an intermediate speed.

The operation of the feeder just described, assuming that the open top of the casing 38 is supplied with a material such as finely-divided smoking tobacco, is as follows:—The rotating fingers 43 in the upper compartment loosen the material somewhat and tend to disintegrate any compacted masses therein. They also sweep the material across the discharge opening at the bottom of the compartment, but inasmuch as the free ends of the fingers move in a lateral or upward direction as they pass over the discharge opening they have no tendency to force or crowd the material downward through said opening, and hence the intermediate compartment receives no material except such as is sufficiently loose and free to permit it to drop by gravity into the same. Furthermore, it receives the material only as fast as space is provided for the same by the discharge from the lower end of the compartment, so that the material does not become compacted therein but, on the contrary, is loosened still more effectively, on account of the greater speed of rotation of the feeder shaft and the smaller quantity on which it acts, and for the same reasons the loosening of the material is completed in the lower compartment so thoroughly and effectively that a continuous and uniform discharge of the material from the lower end of the feeder is secured, the material thus discharged being received in the rear end of the stream controller 13.

It will be observed from inspection of Figs. 6, 7 and 8 that the location of the horizontal axis on which the controller is tilted is such as to cause the rear end of the bottom of the controller to approach the discharge opening from the bottom of the feeder when the controller is moved into the cut-off position, thus choking back the flow of material into the controller. Conversely, when the controller is moved into the full-stream position a free passage for the material from the feeder into the controller is provided, so that the full size of the stream discharged into the weighing bucket is maintained.

A form of feeder which is useful for handling relatively free-flowing materials is shown in Figs. 10 and 11. In this form the feeder comprises a casing 47 containing but a single compartment, which is constructed like the upper portion of the casing 38 and in which there is provided a rotating member 48 having in cross section substantially the shape of a star wheel, with arms extending practically to the walls of the compartment. This member 48, when the shaft 49 which carries it is continuously rotated, serves as a species of measuring device, which acts as a valve to prevent excessive discharge of material from the feeder but transfers successive quantities of material through the same at a rate depending upon its speed of rotation.

Various other feeding devices may be employed in connection with the remaining parts of the apparatus, according to the nature of the material being handled, and, conversely, the feeders above described may be used with other arrangements for controlling the flow of the material delivered thereby, or as continuous-stream feeders.

For opening the closer 10 of the weighing bucket 8 I provide a lever 50 pivotally mounted on the framework 12 and acted on at one end by a cam 51 secured to the countershaft 24, the other end of said lever being provided with a laterally-extending finger 52 located directly over a rearwardly-extending pin 53 carried by the closer 10 on the opposite side of its pivotal axis from the counterweight 11. A spring 54 connected to the lever 50 holds the finger 52 elevated except when it is forced downward by the cam 51, the result of such downward movement being to open the closer and permit the discharge of material from the bucket 8.

In connection with the means for opening the bucket closer as above described, I prefer to employ a spring finger which is caused to exert a tilting pressure on the scale beam 4 in opposition to the weight of the bucket 8 after the latter has been filled. This spring finger, shown at 55, is secured to a rock shaft 56 journaled on the framework 2 beneath the fulcrum blocks 3, with the free end of the finger located over a pin 57 carried by the weighted end of the scale beam, and to said rock shaft is secured a rearwardly-extending arm 58 the rear end of which is forked to embrace a pin 59 on a lever 60 pivotally supported on the framework 12. A spring 61 connected to the lever 60 lifts the finger 55 except when said finger is depressed by the action of a cam 62 secured to the shaft 24 and operating on a roller 63 carried by the lever 60, as shown in Fig. 1, and a stop-pin 64 secured to the framework 2 above the finger 55 arrests the upward movement of said finger, when lifted, at such a point that its free end is engaged by the pin 57 just before the bucket 8 reaches the stop 6 on its downward movement, thereby cushioning the descent of the filled bucket. In operation, after the bucket 8 has received a full load of material and has descended, thus causing the pin 57 to press upward against the spring finger 55, the cam 51 opens the closer 10 and the cam 62 depresses the spring finger 55. The bucket is thereby elevated to its uppermost position in opposition to the action of the finger 52 on the closer, which results in giving the closer a somewhat greater opening movement than would result from the operation of the cam 51 alone, and after the bucket has been thus elevated it is held against downward movement by the spring finger 55 until after the finger 52 has been lifted by the spring 54, the cams 51 and 62 being shaped to secure this result. Consequently the closer remains open a little longer than it would if controlled wholly by the finger 52 and the cam 51, and after a sufficient interval has been allowed for completing the discharge of a load from the bucket the cam 62 permits the spring finger 55 to be elevated to the position shown in Fig. 1, leaving the bucket 8 in its load-receiving position. The above-described action of the spring finger may be likened to the action of the human finger if pressed downward on the weighted end of the scale beam in such manner as to cause the tilting movements of said beam to take place without shock or jar, and at such time as to increase the interval during which the closer 10 is held open.

The connections for rotating the various shafts above described are shown in Figs. 1 and 2. The shaft 34 serves as the main driving shaft of the machine, being provided with a belt pulley 65, and carries a sprocket wheel 66 connected by a chain 67 to a sprocket wheel 68 secured to a countershaft 69; this shaft 69 carries two other sprocket wheels 70 and 71, of which the wheel 70 is connected by a chain 72 to a sprocket wheel 73 on the intermediate feeder shaft 45, while the sprocket wheel 71 drives the other feeder shafts 44 and 46 by means of a chain 74 passing around it and also around sprocket wheels 75 and 76 secured to said shafts respectively, the relative sizes of these various sprocket wheels being such as to rotate the feeder shafts at the desired speeds. The countershaft 24 is driven from the upper feeder shaft by means of sprocket wheels 77 and 78 carried by said shafts respectively and connected by a chain 79.

The power-driven parts above described are so timed in their operation with relation to one another that the stream controller 13 is lowered into full-stream position just after the bucket 8 has discharged a load and its closer 10 has shut. The stream of material which is then delivered into the bucket will evidently be time-controlled, since it will run during an interval depending upon the speed at which the main shaft 34 is driven except as this interval may be varied within the range of adjustment of the cam 23. The speed of rotation of the shaft 34 is therefore determined according to the nature of the material being handled, and is such that after a partial load of material has been delivered into the weighing bucket the cam 23 passes out from under the roller 25 and the stream controller moves into the drip-stream position, where it remains until the load is completed in the bucket. Then the bucket descends and trips the latch 27, and thereupon the delivery of material from the stream controller is cut off, whereupon the cams 51 and 62 cause the bucket closer to be opened and the weighing bucket to be lifted as already explained. In the meantime the cam 23 moves around until it is ready to restore the stream-controller to the full-stream position, whereupon the cycle of operations above described is repeated.

It will be seen from the foregoing description that an important advantage is obtained by the employment of the two independent frameworks 2 and 12 for supporting respectively the weighing mechanism and the feeding mechanism above described, since this arrangement prevents all possibility of interference with the accuracy of the weighing operation by the jar and vibration caused by the operation of the power-driven feeder and other parts carried by the framework 12. The oscillation of the stream controller while it is delivering material is of great advantage in promoting regularity and uniformity of the flow, particularly when it is desired to complete each load by means of a fine stream in order to secure accurate results.

I am aware that it is not new to provide a horizontally oscillating chute for delivering material to a weighing bucket, but so far as I know I am the first to employ such a chute which is also tilted to start and stop the flow of the material. This is an important feature of my invention, since it obviates the use of cut-off valves and permits the material to be fed continuously, so that it cannot become compacted.

The construction of my stream controller and of the other parts and features above described may evidently be modified in various ways without departing from my invention.

I claim:—

1. In an apparatus of the character described, the combination with a weighing receptacle of a stream controller arranged to deliver material thereto, means for oscillating the controller horizontally, means operative upon the completion of a load in the weighing receptacle for tilting the controller to stop the discharge of material therefrom, and means for restoring the controller to discharging position.

2. In an apparatus of the character described, the combination with a weighing receptacle of a stream controller arranged to deliver material thereto, means for continuously oscillating the controller horizontally, means operative upon the completion of a load in the weighing receptacle for elevating the discharge end of the controller, means coöperating therewith to prevent discharge therefrom when elevated, and means for restoring the controller to discharging position.

3. In an apparatus of the character described, the combination with a weighing receptacle of a stream controller arranged to deliver material thereto, means for oscillating the controller horizontally, means operative upon the delivery of a partial load to the weighing receptacle for elevating the discharge end of the controller to drip-stream position, means operative upon the completion of the load in said receptacle for elevating the discharge end of the controller sufficiently to stop the delivery of material therefrom, and means for restoring the controller to discharging position.

4. In an apparatus of the character described, the combination with a weighing receptacle of a stream controller comprising a chute mounted to turn independently on vertical and horizontal axes, and arranged to deliver material to the weighing receptacle, means for oscillating the chute on its vertical axis, and means coöperating with the weighing mechanism for automatically tilting the chute on its horizontal axis to start and stop the delivery of material therefrom.

5. In an apparatus of the character described, the combination with a weighing receptacle of a stream controller comprising a chute mounted to turn independently on vertical and horizontal axes and arranged to deliver material to the weighing receptacle, means for oscillating the controller on its vertical axis, means for tilting the controller on its horizontal axis to regulate the delivery of material therefrom, and a fixed valve member coöperating with the discharge end of the controller to close the same when in elevated position.

6. In an apparatus of the character described, the combination with a weighing receptacle of a stream controller comprising a chute mounted to turn independently on vertical and horizontal axes and arranged to deliver material to the weighing receptacle, means for oscillating the controller on its vertical axis, a gravity-operated arm arranged to tilt the controller into cut-off position, power-operated means for elevating said arm and tilting the controller into discharging position, a latch arranged to engage said arm and hold it in elevated position, and means operative with the descent of the weighing receptacle for tripping said latch.

7. In an apparatus of the character described, the combination with a weighing receptacle of a stream controller arranged to deliver material thereto, means for continuously oscillating the controller horizontally, means controlled by the descent of the weighing receptacle for tilting the controller to cut off the discharge of material therefrom, means for restoring the controller to discharging position, and independent means for supporting the controller during its oscillations in the latter position.

8. In an apparatus of the character described, the combination with a weighing receptacle of a stream controller comprising a chute mounted on independent vertical and horizontal axes and having an open end arranged to deliver material to the weighing receptacle, means for continuously oscillating the controller on its vertical axis, means controlled by the descent of the weighing receptacle for elevating the open end of the controller to cut off the discharge of material therefrom, means for restoring the controller to discharging position, independent means for supporting the controller during its oscillations in the latter position, and a band located in position to extend across the open end of the chute when elevated and serving as a fixed valve member to prevent the discharge of material therefrom.

9. In an apparatus of the character described, the combination with a weighing receptacle of a tilting stream controller arranged to deliver material thereto, and means for operating the controller comprising a counterweighted arm, a power-operated cam for elevating the same, a latch arranged to hold said arm in elevated position, and means operative with the downward movement of the weighing receptacle for tripping said latch.

10. In an apparatus of the character described, the combination with a weighing receptacle of a stream controller comprising a chute mounted on independent vertical and horizontal axes and having an open end arranged to deliver material to the weighing receptacle, an arm connected to the controller for tilting the same and carrying a laterally-extending finger, a counterweighted arm provided with a pin arranged to press downward on said finger, a power-operated cam for elevating said pin, a latch arranged to hold said pin in elevated position, means operative with the downward movement of the weighing receptacle for tripping said latch, and means for continuously oscillating the controller on its vertical axis.

11. In an apparatus of the character described, the combination with a weighing receptacle of a stream controller comprising a chute mounted on independent vertical and horizontal axes and having an open end arranged to deliver material to the weighing receptacle, an arm connected to the controller for tilting the same and carrying a laterally-extending finger, a counterweighted arm provided with a pin arranged to press downward on said finger, a power-operated cam for elevating said pin, a latch arranged to hold said pin in elevated position, means operative with the downward movement of the weighing receptacle for tripping said latch, means for continuously oscillating the controller on its vertical axis, and means for supporting said chute in its lowered position independently of the engagement of said finger and pin.

12. In an apparatus of the character described, the combination with a weighing receptacle of means for supplying material thereto, comprising a casing containing a series of communicating compartments located one above another and each having a rotating agitator therein.

13. In an apparatus of the character described, the combination with a weighing receptacle of a stream controller arranged to deliver material thereto, means for tilting the controller to regulate the discharge of material therefrom, and a power-driven feeder arranged to deliver material to said controller and comprising a casing containing a series of communicating compartments located one above another and each having a rotating agitator therein.

14. In an apparatus of the character described, the combination with a weighing receptacle of a stream controller arranged to deliver material thereto, means for oscillating the controller horizontally, means for tilting the controller to regulate the discharge of material therefrom, and a power-driven feeder arranged to deliver material to said controller and comprising a casing containing a series of communicating compartments located one above another and each having a rotating agitator therein.

15. In an apparatus of the character described, the combination with a weighing receptacle of a stream controller arranged to deliver material thereto, means for oscillating the controller horizontally, means for elevating and lowering the discharge end of the controller, and a power-driven feeder arranged to deliver material to said controller adjacent to its axis of oscillation.

16. In an apparatus of the character described, the combination with a weighing receptacle of a stream controller arranged to deliver material thereto, means for oscillating the controller horizontally, means for elevating and lowering the discharge end of the controller, and a power-driven feeder arranged to deliver material to the controller and comprising a casing containing a series of communicating compartments located one above another and progressively diminishing in size from top to bottom, a rotary agitator located in each of said compartments, and means for rotating said agitators at different speeds.

17. The combination of a stream controller, means for oscillating the same horizontally, means for elevating and lowering its discharge end, and a power-driven feeder arranged to deliver material to the controller at such a point that the delivery is choked as the discharge end of the controller is elevated.

18. The combination of a stream controller mounted to oscillate on a vertical axis and to tilt on a horizontal axis, means for continuously oscillating the controller, means for elevating and lowering its discharge end, a fixed valve member coöperating with the discharge end of the controller to close the same when in elevated position, and a power-driven feeder arranged to deliver material to said controller adjacent to its horizontal axis.

19. In an apparatus of the character described, the combination of two independent frameworks, a scale carried by one of the frameworks and comprising a weighing bucket and a closer therefor, and power-driven means carried by the other framework for supplying the weighing bucket with material and for effecting the opening of its closer.

20. In an apparatus of the character described, the combination of two independent frameworks, a weighing apparatus carried by one of the frameworks, and power-driven means carried by the other framework for supplying the weighing apparatus with material, comprising a stream controller and means for oscillating the same horizontally.

21. In an apparatus of the character described, the combination of two independent frameworks, a weighing apparatus carried by one of the frameworks, and power-driven means carried by the other framework for supplying the weighing apparatus with material, comprising a stream controller, means for oscillating the same horizontally, and means for tilting the controller to regulate the delivery of material therefrom.

22. In an apparatus of the character described, the combination of two independent frameworks, a weighing apparatus carried by one of the frameworks and comprising a weighing bucket, a closer therefor, and a counterweight for holding the closer shut, and power-operated means carried by the other framework for supplying the weighing bucket with material and for engaging and opening its closer.

23. In an apparatus of the character described, the combination of to independent frameworks, a weighing apparatus carried by one of the frameworks and means carried by the other framework for supplying the weighing apparatus with material, comprising a power-operated feeder and means for regulating the flow of the material discharged therefrom.

24. In an apparatus of the character described, the combination of two independent frameworks, a weighing apparatus carried by one of the frameworks, and means carried by the other framework for supplying the weighing apparatus with material, comprising a power-operated feeder, a stream controller for regulating the flow of the material from the feeder to the weighing apparatus, and means for oscillating said controller horizontally.

25. In an apparatus of the character described, the combination with a scale beam and a weighing receptacle carried thereby, of a spring finger and means for operating the same to elevate the weighing receptacle prior to the complete discharge of a load therefrom.

26. In an apparatus of the character described, the combination with a scale beam and a weighing receptacle carried thereby, of a spring finger arranged to engage the scale beam upon the descent of the weighing receptacle, and means for operating said spring finger to elevate the weighing receptacle prior to the complete discharge of a load therefrom.

27. In an apparatus of the character described, the combination with a scale beam, a weighing receptacle carried thereby, and a closer for said receptacle, of a spring finger and means for operating the same to elevate the receptacle prior to the complete discharge of a load therefrom, and power-operated means for opening said closer.

28. In an apparatus of the character described, the combination with a scale beam and a weighing receptacle carried thereby, and provided with a closer having a counterweight for holding it shut, of power-operated means for opening said closer, a spring finger arranged to engage the scale beam and elevate the weighing receptacle prior to the complete discharge of a load therefrom, and means for operating said spring finger.

In testimony whereof, I have hereunto subscribed my name this 5th day of January, 1914.

JOHN D. WEBBER.

Witnesses:
HARRY O. BARTON,
ELIZABETH M. ROBERTSON.

Copies of this patent may be obtained for five cents each, by addressing the "Commissioner of Patents, Washington, D. C."